United States Patent [19]

Scherping et al.

[11] Patent Number: 4,997,865

[45] Date of Patent: Mar. 5, 1991

[54] AQUEOUS COATING AGENT, PROCESS FOR ITS MANUFACTURE AND ITS USE FOR COATING CONTAINERS BASED ON ACRYLIC MONOMERS, EPOXY-POLYESTERS AND METHYLOL FUNCTIONAL CURING AGENTS

[75] Inventors: Karl-Heinz Scherping, Drensteinfurt; Hans-Jorg Holscher, Munster; Uwe Reichelt, Tecklenburg; Udo Reiter, Telgte, all of Fed. Rep. of Germany

[73] Assignee: BASF Lacke & Farben AG, Münster, Fed. Rep. of Germany

[21] Appl. No.: 327,964

[22] PCT Filed: Aug. 13, 1987

[86] PCT No.: PCT/EP87/00445

§ 371 Date: Feb. 14, 1989

§ 102(e) Date: Feb. 14, 1989

[87] PCT Pub. No.: WO88/01287

PCT Pub. Date: Feb. 25, 1988

[30] Foreign Application Priority Data

Aug. 16, 1986 [DE] Fed. Rep. of Germany ....... 3627860

[51] Int. Cl.$^5$ .......................... C08L 63/00; C09D 3/00
[52] U.S. Cl. ...................... 523/409; 523/412; 204/181.6; 427/386
[58] Field of Search ................. 523/409, 412; 427/386; 204/181.6

[56] References Cited

U.S. PATENT DOCUMENTS

| | | | |
|---|---|---|---|
| 4,247,439 | 1/1981 | Matthews et al. | 523/412 |
| 4,302,373 | 11/1981 | Steinmetz | 523/409 |
| 4,423,165 | 12/1983 | Harper et al. | 523/412 |
| 4,444,923 | 4/1984 | McCarty | 523/412 |
| 4,476,262 | 10/1984 | Chu et al. | 523/412 |

FOREIGN PATENT DOCUMENTS 2343007 3/1977 France .
2152065 12/1984 United Kingdom .

*Primary Examiner*—Earl Nielsen
*Assistant Examiner*—Frederick Krass
*Attorney, Agent, or Firm*—Kenyon & Kenyon

[57] ABSTRACT

The invention relates to an aqueous coating agent, obtained from an epoxy resin, ethylenically unsaturated monomers, some of which contain carboxyl groups, a peroxide initiator in a proportion of at least 2% by weight, relative to the total weight of the monomers, a crosslinking agent, a neutralizing agent, organic solvents, and, if appropriate, further conventional additives, such as plasticizers, stabilizers, wetting agents, dispersion auxiliaries, catalysts and pigments. The coating agent is based on a binder (a) which is obtainable from (A) 20 to 80% by weight of an epoxy resin having an average of more than one epoxy group per molecule and having an average molecular weight of at least 500, (B) 1 to 60% by weight of polyester polycarboxylic acids having an average molecular weight of 500 to 5,000 and having an acid number of 30 to 150, and (C) 10 to 50% by weight of ethylenically unsaturated monomers, 10 to 50% by weight of the monomers containing carboxyl groups, where the sum of (A), (B) and (C) is 100% by weight, the binder (a) has an acid number of 20 to 150, and the crosslinking agents (b) used are phenolic and/or amino resins, with the proviso that the coating agent contains (a) 30 to 70% by weight of the binder (a), (b) 2 to 30% by weight, preferably 5 to 16% by weight, of the crosslinking agent (b), (c) 1 to 7% by weight, preferably 2 to 5% by weight, of ammonia and/or amine as neutralizing agent, and (d) 20 to 60% by weight of organic solvents, where the sum of (a), (b), (c) and (d) is 100% by weight. The present invention also relates to a process for the preparation of the coating agents, and the use thereof for coating of cans.

25 Claims, No Drawings

AQUEOUS COATING AGENT, PROCESS FOR ITS MANUFACTURE AND ITS USE FOR COATING CONTAINERS BASED ON ACRYLIC MONOMERS, EPOXY- POLYESTERS AND METHYLOL FUNCTIONAL CURING AGENTS

The invention relates to an aqueous coating agent obtained from an epoxy resin, ethylenically unsaturated monomers, some of which contain carboxyl groups, a peroxide initiator, a crosslinking agent, a neutralizing agent, organic solvents, and, if appropriate, further conventional additives, such as plasticizers, stabilizers, wetting agents, dispersion auxiliaries, catalysts and pigments.

High-molecular-weight epoxy resins are suitable, in particular, for internal protective lacquers for tinplate packaging. The crosslinking agents used are, for example, phenol-formaldehyde, melamine and urea resins. Due to the prespecified application viscosity, such coating agents based on solvents have a solvent content which is usually between 70 and 60%. If—as in the coating of two-part drink cans—it is necessary to carry out the application of the coating by spraying, a further increase in the solvent content usually results, which has the consequence of great pollution through solvent emissions.

In contrast to this, the advantages of aqueous coating systems are to be seen in a markedly reduced solvent emission. In this connection, the application of aqueous synthetic resin dispersions by means of electrocoating is particularly advantageous, since a virtually 100% coating yield and a further reduced emission of solvents can be achieved using this method. In addition, it is possible to coat a very wide variety of can geometries using electrophoretic coating through the effect of the throwing power of electrodeposition coatings, a uniform coating thickness, and thus also good edge coverage, being achieved, in contrast to coating application by spraying. In addition, the electrocoating process offers the best prerequisites for process automation, this process additionally offering the opportunity for savings besides the reduced material requirement.

As is known, electrocoating can be employed both for anionic and for cationic binder systems. However, in the case of contact with foodstuffs, for example for internal coatings of cans, it must be remembered that internal protective coatings must meet strict legal requirements regarding foodstuffs. In addition, such coatings must be stable on storage in contact with the contents, which are mainly acidic to neutral. Taking into account these requirements, anodic electrocoating is, in principle, more advantageous than the cathodic version since cathodically deposited films usually contain amine groups and can thus give rise to stability weaknesses on contact with acidic contents.

Solvent containing internal protective coatings for cans which are based on combinations of epoxy resins and phenol-formaldehyde resins or amino resins and which have good properties have long been known for coating cans. In particular, epoxy resins which are based on bisphenol A and have average molecular weights of more than 3,000 g/mol give rise to very resistant coatings, whereas phenolformaldehyde resins make a decisive contribution to stability against acidic and sulfur-producing contents.

In order to use such systems in an aqueous medium, the epoxy resin must be modified by incorporation of solubilizing groups in a fashion such that a water-soluble or water-dispersible system is produced. Cationic, aqueous systems can be obtained in a known fashion by reaction of epoxy resins with amines. For the preparation of anionically dissolved synthetic resins, a carboxyl functionality is usually introduced. To this purpose, the epoxy resin, as described, for example, in U.S. Pat. No. 3,862,914, is converted into a carboxyl-functional polymer by means of a reaction with polycarboxylic anhydrides. Such systems, in which polycarboxylic acids are bound to polymers via monoester functions, are however extremely susceptible to hydrolysis, which causes the storage stability of the corresponding aqueous dispersions of such polymers to be too low (E. T. Turpin, J. Paint Technol., Vol. 47, No. 602, page 40, 1975). Hydrolysis-stable attachment of the carboxyl functionality to the epoxy resin can be achieved according to U.S. Pat. No. 3,960,795 by reacting the epoxy functions with parahydroxybenzoates with formation of an ether bond, followed by hydrolysis of the benzoate with liberation of the carboxyl functionality. The disadvantage of this method is that, in particular, the high-molecular-weight epoxy resins which are required for internal protective coatings for cans cannot be functionalized with carboxyl groups by this route to the extent necessary for an aqueous dispersion, as a consequence of their low content of epoxy groups.

U.S. Pat. No. 4,247,439 and European Patent Nos. 6334 and 6336 disclose hydrolysis-stable aqueous internal protective coatings for cans, which coatings are obtained from products of the esterification of epoxy resins using carboxyl-functional polyacrylate resins. In addition, hydrolysis-stable, aqueous internal protective coatings for cans have been disclosed by U.S. Pat. Nos. 4,212,781 and 4,308,185.

The genus-forming U.S. Pat. No. 4,212,781 discloses resin mixtures which are dispersible in an aqueous, basic medium and which are obtained by copolymerization of ethylenically unsaturated monomers, some of which contain carboxyl groups, in the presence of an aliphatic or aromatic 1,2-diepoxy resin using at least 3% by weight, relative to the weight of the monomer, of benzyl peroxide or equivalent initiators. The resin mixtures disclosed by U.S. Pat. No. 4,212,781 can be crosslinked using amino resins. They are suitable, in particular, for spray coating of drink cans.

German Offenlegungsschrift No. 3,446,178 discloses water-dilutable compositions for coating of metal cans, the polymer present in the composition comprising a product of the reaction of acrylic monomers, a high-molecular-weight epoxy resin, a phenol-formaldehyde resin and a free-radical initiator.

The aqueous systems known from the prior art are employed mainly for spray coating of two-part aluminum drink cans. They have the disadvantage that they offer inadequate surface protection on difficult substrates, such as, for example, drawn and ironed drink cans made from tinplate.

The object of the present invention was to provide an aqueous coating agent for coating metal cans, where universal applicability of the coating agents is to be guaranteed, i.e. the coating agents must be suitable for coating cans made from aluminum, tinplate and other specifically surface-pretreated steel. In particular, the coating of two-part drink cans is considered, but, in addition, also the coating of food cans, which need to be stable to a wide range of contents, even under sterilization conditions. The new coating systems are also intended to offer adequate surface protection on difficult substrates. Substrates which are regarded as difficult here are, for example, drawn and ironed tinplate cans which have a thin tin coating and whose surface, as is known, comprises iron, a little free tin and various iron-tin alloys. In particular, the aqueous dispersions are intended to be storage-stable, and they should allow themselves to be readily pigmented. Coating agents prepared therefrom should allow themselves to be applied without flaws by spray coating and also by anodic electrocoating. In the case of electrocoating, the binders must coagulate at the can, connected as the anode, under the influence of the electrode reactions to form a closed coating film which has the highest possible film resistance. In this process, all coating agent components, such as crosslinking agents, auxiliaries and, if appropriate, pigments must be deposited in the amount ratio in which they are also present in the dispersion. In most systems of the prior art, the problem occurs that the neutral crosslinking agent is not deposited to the extent that it is present in the aqueous dispersion.

A further requirement of the coating agents to be prepared is that the electrodeposition coatings should make possible coating times of between about 0.5 and 30 seconds, taking into account the circumstances in industrial can manufacture. Under these conditions, it must be possible to produce film thicknesses of between about 4 and 10 μm which are typical for tinplate packaging. To accomplish this, the wet-film resistance must be at least $10^8 \Omega^{-1} cm^{-1}$. The throwing power of the electrodeposition coating should be so well developed that it is possible to coat even complicated can geometries with an impermeable coating film of constant coating thickness. Furthermore, the current strength/voltage characteristics of the electrocoating materials must be matched to electrode geometries which can be used in practice.

The wet deposited films should be sufficiently hydrophobic to make it possible to rinse the cans with common rinsing media, such as distilled water, drinking water, ultrafiltrate, and to exclude redissolution in the electrocoating material.

The baked coating films should at least reach the property levels of conventional internal protective coatings for cans with respect to freedom from pores, stability towards the contents, adhesion to the metal, hardness, elasticity and flavor neutrality, or should surpass these levels. To this purpose, the residual monomer contents in the binders must, if appropriate, be kept as small as possible by suitable preparation processes. For first assessment of the contents stability in the form of short tests, the pasteurization or sterilization stability of baked coating films towards various test solutions—in the simplest case towards water—is important here.

The object of the present invention is achieved by the aqueous coating agent of the type mentioned initially, wherein the coating agent is based on a binder (a) which is obtainable from (A) 20 to 80% by weight of an epoxy resin having an average of more than one epoxy group per molecule and having an average molecular weight of at least 500, (B) 1 to 60% by weight of polyester polycarboxylic acids having an average molecular weight of 500 to 5,000 and having an acid number of 30 to 150, and (C) 10 to 50% by weight of ethylenically unsaturated monomers, 10 to 50% by weight of the monomers containing carboxyl groups, where the sum of (A), (B) and (C) is 100% by weight, the peroxide initiator is employed in a proportion of at least 2% by weight, relative to the total weight of the monomers (C), the binder (a) has an acid number of 20 to 150, and the crosslinking agents (b) used are phenolic and/or amino resins, with the proviso that the coating agent contains (a) 30 to 70% by weight of the binder (a),
(b) 2 to 30% by weight, preferably 5 to 16% by weight, of the phenolic and/or amino resin (b),
(c) 1 to 70% by weight, preferably 2 to 5% by weight, of ammonia and/or amine as neutralizing agent, and
(d) 20 to 60% by weight of organic solvents, where the sum of (a), (b), (c) and (d) is 100% by weight.

As component (A), polyglycidyl ethers of bisphenol A having an average molecular weight of 500 to 20,000 are preferably employed. Examples of suitable epoxy resins are glycidyl polyethers, which are marketed, for example, under the tradenames Epikote 1001, 1004, 1007 and 1009. The epoxy resins component (A) advantageously have an average molecular weight of at least 3,000 g/mol.

The polyester polycarboxylic acids employed as component (B) are prepared under the conditions known to those skilled in the art for polyesterification reactions. These compounds are known polycondensates made from aromatic and/or aliphatic dicarboxylic acids, aromatic dicarboxylic anhydrides, aromatic tricarboxylic anhydrides, aromatic tetracarboxylic anhydrides and dianhydrides, and aliphatic and cycloaliphatic mono-, di- and triols. Preferred starting compounds for the polyester polycarboxylic acids are terephthalic acid, isophthalic acid, trimellitic acid, trimellitic anhydride, adipic acid, sebacic acid, aliphatic monools having 4 to 20 carbon atoms, 2,2-dimethyl-1,3-propanediol, ethylene glycol, diethylene glycol, trimethylol propane, glycerol and pentaerythritol.

The polyester polycarboxylic acids (B) preferably have an average molecular weight of 1,000 to 3,000 and an acid number of 50 to 100.

A preferred embodiment of the polyester polycarboxylic acid component (B) comprises using ester diols and/or glycidyl esters of monocarboxylic acids as the polyol component for the preparation of the polyester polycarboxylic acids. Neopentyl glycol hydroxypivalate may be mentioned as an example of a suitable ester diol. A suitable commercially available glycidyl ester of monocarboxylic acids is the glycidyl ester of versatic acid, a branched monocarboxylic acid.

The polyester polycarboxylic acids prepared using ester diols and/or glycidyl esters of monocarboxylic acids have acid numbers in the range from 100 to 130.

10 to 50% by weight of the ethylenically unsaturated monomers employed as component (C) are monomers containing carboxyl groups. Examples which should be mentioned of monomers containing carboxyl groups are acrylic acid and methacrylic acid. In addition, nonfunctionalized monomers, such as, for example, styrene, vinyltoluene and q-methylstyrene, may be employed as monomers.

(Meth)acrylates having 1 to 20 carbon atoms in the alcohol radical are preferably used as the third class of monomers, it also being possible to employ hydroxyfunctional monomers. Examples of these are ethyl acrylate, propyl acrylate, isopropyl acrylate, butyl acrylate, isobutyl acrylate, t-butyl acrylate, pentyl acrylate, decyl acrylate, lauryl acrylate, methyl methacrylate, butyl methacrylate, isobutyl methacrylate, hexyl methacrylate, 2-ethylhexyl methacrylate, octyl methacrylate, nonyl methacrylate, hydroxyethyl acrylate, hydroxypropyl acrylate, hydroxybutyl acrylate, hydroxyethyl methacrylate, hydroxypropyl methacrylate and hydroxybutyl methacrylate.

The ethylenically unsaturated monomers of component C) preferably comprise (x) 10 to 50% by weight, preferably 20 to 40% by weight, of monomers containing carboxyl groups,
(y) 0 to 50% by weight, preferably 20 to 40% by weight, of nonfunctionalized monomers, and
(z) 5 to 60% by weight, preferably 10 to 50% by weight, of (meth)acrylates, having 1 to 20 carbon atoms in the alcohol radical, and, if appropriate, being hydroxyfunctional, where the sum of x), y) and z) is 100% by weight.

Component (C) has an acid number in the range from 30 to 150, preferably in the range from 50 to 100.

The binder (a) is preferably obtained from 35 to 60% by weight of (A), 10 to 35% by weight of (B) and 15 to 30% by weight of (C), where the sum of (A), (B) and (C) is 100% by weight.

It is preferred that at least 2.6% by weight, particularly preferably at least 3% by weight, relative to the total weight of the ethylenically unsaturated monomers, of peroxide initiators are employed.

According to the present invention, any phenolic resin can be used so long as it has the methylol functionality which is necessary for the reactivity. Preferred phenolic resins are products, prepared under alkaline conditions, of the reaction of phenol, substituted phenols and bisphenol A with formaldehyde. Under such conditions, the methylol group is linked to the aromatic ring either in the ortho or in the para position.

Phenolic resins of the resol type which are based on bisphenol A and contain more than one methylol group per phenyl ring are preferably employed.

Typical amino resins are melamine, benzoguanamine and urea-formaldehyde resins. These are preferably used in the form which has been etherified with lower alcohols, usually butanol. Suitable amino resins are commercially available, for example, under the tradename Cymel. A suitable amino resin is, for example, hexamethoxymethylmelamine.

Of course, besides condensation products with formaldehyde, those with other aldehydes can also be used.

According to the invention, the coating agent contains 1 to 7% by weight, preferably 2 to 5% by weight, of ammonia and/or amines as neutralizing agents. The coating agent becomes dispersible in water through neutralization with component (c). Triethylamine and/or dimethylethanolamine are preferably employed as neutralizing agents.

The aqueous coating agents according to the invention furthermore contain 20 to 60% by weight of organic solvents. When the aqueous coating agents are used as anodic electrodeposition coatings, it must be ensured that the organic solvents positively influence the effectiveness of the anodic deposition and the flow of the coating film. In a preferred fashion, nonvolatile cosolvents are employed, such as monoalcohols having 4 to 18 carbon atoms, glycol ethers, such as, for example, ethylene glycol monoethyl ether and its higher homologs having 5 to 20 carbon atoms, or corresponding ethers of 1,2- and 1,3-propanediol.

The coating agents according to the invention and described above are prepared in a process wherein the epoxy resin (A) is initially reacted with the polyester polycarboxylic acid component (B) at 80° to 200° C., preferably at 120° to 180° C., with the use of catalysts, so that at least 80% of the oxirane rings initially present are opened, component (C) is subsequently subjected to free-radical polymerization, in the presence of the reaction product obtained in the first process step, at 100° to 160° C., preferably 120° to 140° C., with the use of at least 2% by weight, relative to the weight of the ethylenically unsaturated monomers, of peroxidic initiators preferably ones which generate benzoyloxy and/or phenyl free radicals, the product obtained is neutralized in a third process step using component (c), and the organic solvent (d), the crosslinking agent (b) and, if appropriate, further conventional additives are added and mixed, and the coating agent is dispersed in water.

The reaction of the epoxy resin with polyester polycarboxylic acids taking place in the first process step is catalyzed by amines, preferably tertiary amines. The reaction is carried out in a fashion such that at least 80% of the oxirane rings are converted into $\beta$-hydroxyester groups.

In the second process step, the ethylenically unsaturated monomers, some of which contain carboxyl groups, of component (C) are subjected to a free-radical polymerization reaction in the presence of the $\beta$-hydroxyester produced in the first process step. The free-radical polymerization is initiated by at least 2% by weight, relative to the total weight of the monomers, of peroxidic initiators, preferably ones which generate benzoyloxy and/or phenyl free radicals. In this reaction, at least 2.6% by weight of initiators are preferably used, particularly preferably at least 3% by weight. Of course, good results are also achieved when high proportions, for example 8 to 10% by weight, of initiators are employed, but this is not recommended for economic reasons. If the polymerization is carried out in the presence of relatively low initiator concentrations, for example with less than 3% by weight, relative to the monomer weight, a higher degree of neutralization is necessary in order to obtain a stable dispersion (cf. Example 3 from Table 1).

Primarily, peroxidic initiators are employed which decompose to produce benzoyloxy and/or phenyl free radicals.

Of course, it is also possible to use other initiators so long as these lead to equivalent free-radical conditions.

Preferred initiators are dibenzoyl peroxide and/or tert. butyl perbenzoate. Further possible initiators which should be mentioned are tert. butyl peroctoate, cumene hydroperoxide and methyl ethyl ketone peroxide.

The proportion of residual monomers is advantageously kept to less than 0.2%, relative to the sum of (a) to (d), by adding further initiator and/or by extending the initiator feed time.

After the free-radical polymerization, the polymer obtained is neutralized in a third process step in order to make the coating agent water-dispersible. The nonvolatile cosolvent (d) necessary for production of a readily flowing, anodically deposited film, the phenolic resins or amino resins (b) used as crosslinking agents, and further additives which are conventional, for example, in electrocoating are added and mixed with the system. Finally, the system is dispersed in water.

A preferred embodiment of the process according to the invention comprises carrying out a precondensation with the crosslinking agent (b) after the free-radical polymerization. In this fashion, the crosslinking agent (b) is also deposited during electrocoating to the same extent as it is present in the aqueous coating agent.

The mixture obtained before dispersal in water can be used as a compensation coating by not preparing the aqueous dispersion until the binder is incorporated into the electrodeposition coating.

A preferred embodiment of the process according to the invention comprises already using the organic solvent (d) as a solvent in the esterification, occurring as the first process step, of the epoxy resin (A) and the polyester polycarboxylic acids (B).

The aqueous coating agents according to the invention are advantageously used for anodic electrocoating of cans and can halves. Of course, they can also be employed for spray coating of cans. In anodic electrocoating, the cans are dipped in an aqueous bath based on the coating agent according to the invention described above and are connected as the anode.

By means of direct current, a film is deposited on the cans, the substrate is removed from the bath, and the film is hardened by baking.

Both in spray coating and in electrodeposition, the final hardening of the coating film is carried out by baking.

The aqueous coating agents according to the invention are suitable for coating of cans which can comprise different materials and which can have a very wide variety of can geometries. Thus, cans made from aluminum and those made from tinplate, for example drawn and ironed, two-part drink cans, can be coated equally well using the coating agents according to the invention. In addition, cans made from surface-pretreated steel sheeting can be coated excellently.

The aqueous coating agents described above are likewise highly suitable for coating foodstuff cans which have been drawn and ironed or deep-drawn in another fashion and which are subjected to sterilization for preservation of the contents.

The can halves discussed are bodies and lids which are used for the manufacture of foodstuff cans. Anodic coating of the can halves has proven particularly advantageous when the bodies are welded and the lids are pull-tab lids.

The advantages of the process according to the invention are that there is a wide variety of possible ways of controlling the acid number by varying the polyester or the polymer. In this fashion, applicational properties and adhesion properties can be optimized for specific metal surfaces. The compatibility of the components with one another and the safety with respect to residual monomers are ensured by the polymerization process.

The aqueous coating agents according to the invention are storage-stable and can be applied without flaws by means of anodic electrocoating. The baked coating films obtained have a good property level with respect to freedom from pores, stability towards the contents, adhesion to the metal, hardness, elasticity and flavor neutrality. In addition, the binder combinations employed enable good pigment wetting.

The invention is described in greater detail below with reference to illustrative embodiments:

1. Preparation of a polyester polycarboxylic acid 1.1 1,330 g of isophthalic acid, 145 g of adipic acid, 780 g of 2,2-dimethyl-1,3-propanediol, 268 g of trimethylolpropane and 200 g of isodecanol are weighed out into a four-neck flask fitted with stirrer, thermometer and water separator, and the mixture is condensed at 220° C. to an acid number of less than 5 mg of KOH/g. 500 g of trimellitic anhydride are added at 170° C., and the batch is kept at this temperature until the viscosity becomes constant. Finally, the polyester resin melt is dissolved in butyl glycol to give a 70% strength solution. The acid number is 85 mg of KOH/g.

1.2 1,200 g of the glycidyl ester of versatic acid, 900 g of 2-butanone, 900 g of trimellitic anhydride and 5 g of N,N-dimethylbenzylamine are warmed to 90° C. in a four-neck flask fitted with stirrer, thermometer and reflux condenser. When the viscosity (measured at 23° C.) has increased to 1.5 Pas, the batch is cooled and discharged.

2. Preparation of epoxy ester resins 2.1 Preparation of an epoxy ester resin based on the polyester polycarboxylic acid prepared under 1.1.

A mixture of 1,050 g of an epoxy resin based on bisphenol A and having an epoxy equivalent weight of 3,400, 700 g of butyl glycol, 350 g of 1-phenoxy-2-propanol, 2 g of N,N-dimethylbenzylamine and 1,000 g of the polyester polycarboxylic acid prepared under 1.1 is warmed to 160° C. in a four-neck flask fitted with stirrer, thermometer and reflux condenser until the acid number has fallen to 20 mg of KOH/g. In a 30% strength solution in butyl glycol, the epoxy ester thus prepared has a viscosity of 370 mPa.s at 23° C.

2.2 Preparation of an epoxy ester based on the polyester carboxylic acid prepared under 1.2.

A solution of 1,050 g of an epoxy resin based on bisphenol A and having an epoxy equivalent weight of 3,400, in 1,000 g of butyl glycol and 440 g of propylene glycol monophenyl ether is heated to 140° C. in a four-neck flask fitted with stirrer, thermometer and distillation attachment. After 2 g of N,N-dimethylbenzylamine are added, 950 g of the polyester polycarboxylic acid prepared under 1.2 are run in and the solvent (2-butanone) is simultaneously distilled off. The batch is kept at 160° C. for a further 3 hours. The acid number is then 37 mg of KOH/g and the viscosity (of a 30% strength solution in butyl glycol at 23° C.) is 380 mPa.s.

3. Preparation of binder solutions from the epoxy ester resins prepared under 2.

3.1 Preparation using the epoxy ester resin prepared under 2.1.

EXAMPLE 1

2,400 g of the epoxy ester prepared under 2.1 are placed in a four-neck flask fitted with stirrer, thermometer, reflux condenser and two supply containers. At 140° C., a mixture of 130 g of acrylic acid, 160 g of styrene and 200 g of butyl acrylate is added to this from the first supply container and a solution of 30 g of tert. butyl perbenzoate in 40 g of butyl glycol is simultaneously added from the second supply container. The monomers are added over 2 hours and the initiator over 3 hours. When the polymerization is complete, 190 g of a highly methylolated bisphenol A-formaldehyde resin are precondensed with the batch at 90° C. for 2 hours.

A 58% strength binder solution is produced which, after addition of basic neutralizing agents, can be employed directly as a compensation coating for anodic electrocoating.

EXAMPLE 2

2,400 g of the epoxy ester prepared under 2.1 are placed in a four-neck flask fitted with stirrer, thermometer, reflux condenser and two supply containers. At 140° C., a mixture of 130 g of acrylic acid, 160 g of styrene and 200 g of butyl acrylate is added to this from the first supply container and a solution of 30 g of tert. butyl perbenzoate in 40 g of butyl glycol is added simultaneously from the second supply container. The monomers are added over 2 hours, and the initiator over 3 hours. When the polymerization is complete, 190 g of a butylated melamine-formaldehyde resin are added.

A 58% strength binder solution is produced which, after addition of a basic neutralizing agent, can be employed directly as a compensation coating for anodic electrocoating.

EXAMPLE 3

2,352 g of the epoxy ester prepared under 2.1 are placed in a four-neck flask fitted with stirrer, thermometer, reflux condenser and two supply containers. At 140° C., a mixture of 130 g of acrylic acid, 160 g of styrene and 190 g of butyl acrylate is added to this from the first supply container and a solution of 13.4 g of tert. butyl perbenzoate in 40 g of butyl glycol is added simultaneously from the second supply container. The monomers are added over 2 hours, and the initiator over 3 hours. When the polymerization is complete, 190 g of a highly methylolated bisphenol A-formaldehyde resin are precondensed with the batch at 90° C. for 2 hours.

A 57% strength binder solution is produced which, after addition of basic neutralizing agents, can be employed directly as a compensation coating for anodic electrocoating.

3.2 Preparation using the epoxy ester resin prepared under 2.2.

EXAMPLE 4

2,100 g of the epoxy ester prepared under 2.2 and 300 g of butyl glycol are placed in a four-neck flask fitted with stirrer, thermometer, reflux condenser and two supply containers. At 140° C., a mixture of 130 g of acrylic acid, 160 g of styrene and 200 g of butyl acrylate is added to this from the first supply container and a solution of 30 g of tert. butyl perbenzoate in 40 g of butyl glycol is added simultaneously from the second supply container. The monomers are added over 2 hours, and the initiator over 3 hours. When the polymerization is complete, 190 g of a highly methylolated bisphenol A-formaldehyde resin are precondensed with the batch at 90° C. for 2 hours.

A 56% strength binder solution is produced which, after addition of basic neutralizing agents, can be employed directly as a compensation coating for anodic electrocoating.

3.3 COMPARISON EXAMPLE

Comparison Example 1

Modification of an epoxy resin using trimellitic anhydride

In order to prepare a comparison batch without addition polymer, the high-molecular-weight epoxy resin employed under 2. is reacted with trimellitic anhydride after esterification of the glycidyl radicals using a monocarboxylic acid.

To this purpose, 41.8 parts of a high-molecular weight epoxy resin based on bisphenol A and having an epoxy equivalent weight of 3,400 are dissolved in 41.0 parts of ethylene glycol monobutyl ether and reacted at 130° C. with 1.94 parts of isononanoic acid and 0.06 parts of N,N-dimethylbenzylamine until the acid number has fallen to below 3 mg of KOH/g. 7.7 parts of trimellitic anhydride are added, and the temperature is maintained until an acid number of 80 mg of KOH/g is reached. After cooling to 90° C., 3.5 parts of a phenol-formaldehyde resin (resol type based on bisphenol (A) are added, and the batch is stirred at 90° C. for 2 hours. The solids content is then 55%.

Comparison Example 2

Preparation of an acrylic-epoxy graft polymer

In order to prepare a comparison batch, a monomer mixture is polymerized in the presence of a high-molecular-weight epoxy resin, but in the absence of a polyester component.

To this purpose, 1,120 g of a high-molecular-weight epoxy resin based on bisphenol A and having an epoxy equivalent weight of 3,400 are dissolved in 570 g of butyl glycol and 850 g of n-butanol and reacted at 140° C. with 44 g of dimethylolpropanoic acid and 1.5 g of N,N-dimethylbenzylamine until the acid number has fallen to below 3 mg of KOH/g. A mixture of 175 g of methacrylic acid, 130 g of styrene, 5 g of 2-ethylhexyl methacrylate and 28 g of benzoyl peroxide (75% strength) is added to this at 120° C. within 2 hours. When the polymerization is complete, 160 g of a highly methylolated bisphenol A-formaldehyde resin are precondensed with the batch at 90° C. for 2 hours. A 50% strength binder solution having a viscosity (30% strength in solution in butyl glycol) of 0.8 Pa.s and an acid number of 90 mg of KOH/g is produced.

4. Preparation of binder dispersions from the binders of Examples 1, 2, 3 and 4 and Comparison Examples 1 and 2

The binder solutions of Examples 1, 2, 3 and 4 and Comparison Examples 1 and 2 are neutralized with amine according to the figures in Table 1, dispersed slowly in demineralized water with vigorous stirring and adjusted to a solids content of 12%. The properties and characteristic numbers of the resulting dispersions are collated in Table 1.

Binder dispersion E is not adequately stable on storage at room temperature. After one month, the binder has substantially coagulated and the dispersion is destroyed. In contrast, the dispersions A, B, C, D and F are free of sediment even after storage for 6 months at room temperature.

TABLE 1

| Dispersion | A | B | C | D | E | F |
|---|---|---|---|---|---|---|
| Binder | Example 1 | Example 2 | Example 3 | Example 4 | Comparison Example 1 | Comparison Example 2 |
| Amine | N,N-dimethyletha- | N,N-dimethyletha- | N,N-dimethyletha- | N,N-dimethyletha- | Triethylamine | Triethylamine |

TABLE 1-continued

| Dispersion | A | B | C | D | E | F |
|---|---|---|---|---|---|---|
| Degree of neutralization | nolamine 80% | nolamine 80% | nolamine 98% | nolamine 80% | 53% | 49% |
| Storage stability of the dispersion (20° C.) | >6 mon. | >6 mon. | >6 mon. | >6 mon. | <1 mon. | >6 mon. |
| pH | 8.2 | 8.2 | 8.3 | 7.8 | 8.5 | 7.2 |
| Conductivity (μS/cm) | 2000 | 2200 | 2540 | 2700 | 2000 | 1750 |

5. Coating of drink cans with binder dispersions A, B, C, D, E and F from Table 1

5.1 Coating of a drink can with binder dispersion A

EXAMPLE 5

An uncoated, two-part drink can made from tinplate is held at the flange using an electroconductive clip, filled with binder dispersion A and submerged in a conductive vessel which has a diameter of 20 cm, is insulated against earth and has previously likewise been filled with the electrodeposition coating. The positive pole of a direct current voltage source is connected to the can and the negative pole is connected to the external vessel. The coating is carried out using an auxiliary cathode in the can interior. After rinsing with demineralized water, the coating is baked for 5 minutes at 210° C. in a circulation oven. The can is fully coated internally and externally with a thin, clear, impermeable coating film. Measurement results, cf. Table 2.

5.2 Coating of a drink can with binder dispersion B

EXAMPLE 6

The coating is carried out analogously to the procedure under 5.1. The can is fully coated internally and externally with a thin, impermeable, clear coating film. Measurement results, of, Table 2.

5.3 Coating a drink can with pigmented binder dispersion B

EXAMPLE 7

The binder from Example 2 is pigmented with titanium dioxide (binder:pigment=1:1) and adjusted to a solids content of 12.5% using demineralized water. The coating is carried out analogously to 5.1 and 5.2. The can is coated completely with a white coating film. Measurement results, cf. Table 2.

5.4 Coating of a drink can with binder dispersion C

EXAMPLE 8

The coating is carried out analogously to 5.1 and 5.2. The can is fully coated internally and externally with a thin, impermeable, clear coating film. Measurement results, cf. Table 2.

5.5 Coating of a drink can with binder dispersion D

EXAMPLE 9

Coating is carried out analogously to 5.1 and 5.2. The can is fully coated internally and externally with a thin, impermeable, clear coating film. Measurement results, cf. Table 2.

5.6 Coating of a drink can with binder dispersion E

COMPARISON EXAMPLE 3

The coating is carried out analogously to Example 4-9. The can is coated internally and externally with a clear, matt coating film which is not impermeable and has surface defects. Measurement results, cf. Table 2.

5.7 Coating of a drink can with binder dispersion F

COMPARISON EXAMPLE 4

The coating is carried out as described above. The can is coated internally and externally with a clear, matt coating film which is not impermeable and which has surface defects. Measurement results, cf. Table 2.

TABLE 2

| | Example 5 | Example 6 | Example 7 | Example 8 | Example 9 | Comparison Example 3 | Comparison Example 4 |
|---|---|---|---|---|---|---|---|
| Solids content | 12% | 12% | 12.5% | 10% | 12% | 12% | 12% |
| pH | 8.2 | 7.8 | 8.2 | 8.3 | 7.8 | 8.5 | 7.2 |
| Conductivity | 2000 | 2700 | 2200 | 2540 | 2700 | 2000 | 1750 μS/cm |
| Bath temperature | 27° C. | 27° C. | 27° C. | 27° C. | 27° C. | 27° C. | 27° C. |
| Deposition time | 20 s | 20 s | 20 s | 20 s | 20 s | 20 s | 20 s |
| Deposition voltage | 50 V | 60 V | 60 V | 50 V | 60 V | 160 V | 90 V |
| Coating/can | 480 mg | 490 mg | 900 mg | 500 mg | 490 mg | 450 mg | 460 mg |
| Surface | glossy | glossy | glossy | glossy | glossy | matt | matt |
| Porosity, mA (enamel rater) | 0.1 | 0.1 | 0.3 | 1 | 0.1 | 10 | 5 |
| Coating adhesion (cross-hatch test) | Gt 0 | Gt 0 | Gt 0 | Gt 0 | Gt 0 | Gt 1 | Gt 1 |
| Sterilization with water, 30 min/121° C. | OK | OK | OK | OK | OK | water absorption (blushing) | water absorption (blushing) |

The deposited and baked coating films in all examples exhibit no odor, flavor or color impairment of water as the contents. Similar results are achieved when a drink can made from aluminum is used in place of a two-part drink can made from tinplate.

6. Coating of a drink can by means of spray coating using binder dispersion A

The interior of a two-part drink can made from tinplate is spray-coated with anionic binder dispersion A. 65 bar is selected as the spraying pressure. The coating is baked for 2 minutes at 210° C. in a circulation oven. An applied coating layer of 220 mg dry/0.33 l can is produced. The coating film is clear and glossy and has a porosity (enamel rater) of 0.8 mA. The other coating properties (adhesion and sterilization stability) correspond to those of Examples 5 to 9 from Table 2.

We claim:

1. An aqueous coating agent comprising:
   (a) 30 to 70% by weight of a binder having an acid number of 20 to 150 and comprised of the reaction product of:
      (A) 20 to 80% by weight of an epoxy resin having an average of more than one epoxy group per molecule and having an average molecular weight of at least 500,
      (B) 1 to 60% by weight of a polyester polycarboxylic acid having an average molecular weight of 500 to 5,000 and having an acid number of 30 to 150, and
      (C) 10 to 50% by weight of ethylenically unsaturated monomers, 10 to 50% of which contain carboxy groups, and a peroxide initiator which is present in an amount which is at least 2% by weight relative to the weight of the ethylenically unsaturated monomers,
      the sum of (A), (B), and (C) being 100% by weight;
   (b) 20 to 30% by weight of a phenolic or amino resin crosslinking agent;
   (c) 1 to 7% by weight of ammonia or an amine neutralizing agent, and
   (d) 20 to 60% by weight of an organic solvent,
   the sum of (a), (b), (c) and (d) being 100% by weight.

2. A coating agent as claimed in claim 1 wherein the peroxide initiator is at least 2.6% by weight relative to the total weight of the ethylenically unsaturated monomers.

3. A coating agent as claimed in claim 1, wherein the epoxy resin (A) is based on bisphenol A.

4. A coating agent as claimed in claim 1 wherein the epoxy resin (A) has an average molecular weight of at least 3,000.

5. A coating agent as claimed in claim 1 wherein the polyester polycarboxylic acid has an average molecular weight of 1,000 to 3,000 and an acid number of 50 to 100.

6. A coating agent as claimed in claim 1 wherein the polyester polycarboxylic acid contains an alcohol component which is an ester diol and/or a glycidyl ester of a monocarboxylic acid.

7. A coating agent as claimed in claim 1 wherein the ethylenically unsaturated monomers (C) comprise
   (x) 10 to 50% by weight of a monomer containing carboxyl groups,
   (y) 0 to 50% by weight of a nonfunctionalized monomer, and
   (z) 5 to 60% by weight of a (meth) acrylate having 1 to 20 carbon atoms in the alcohol radical,
   where the sum of (x), (y) and (z) is 100% by weight.

8. A coating agent as claimed in claim 1, wherein the binder A) is comprised of from 30 to 69% by weight of (A), 10 to 35% by weight of (B) and 15 to 30% by weight of (C).

9. A coating agent as claimed in claim 1 wherein (b) is a phenolic resin of the resol type based on bisphenol A which contains more than one methylol group per phenyl ring.

10. A coating agent as claimed in claim 1, wherein the neutralizing agent (c) is triethylamine or dimethylethanolamine.

11. A process method of coating an article comprising applying to said article an aqueous coating agent comprised of:
   (a) 30 to 70% by weight of a binder having an acid number of 20 to 150 and comprised of the reaction product of:
      (A) 20 to 80% by weight of an epoxy resin having an average of more than one epoxy group per molecule and having an average molecular weight of at least 500,
      (B) 1 to 60% by weight of a polyester polycarboxylic acid having an average molecular weight of 500 to 5,000 and having an acid number of 30 to 150, and
      (C) 10 to 50% by weight of ethylenically unsaturated monomers, 10 to 50% of which contain carboxy groups, and a peroxide initiator which is present in an amount which is at least 2% by weight relative to the weight of the ethylenically unsaturated monomers,
      the sum of (A), (B) and (C) being 100% by weight:
   (b) 2 to 30% by weight of a phenolic or amino resin crosslinking agent;
   (c) 1 to 7% by weight of ammonia or an amine neutralizing agent, and
   (d) 20 to 60% by weight of an organic solvent, the sum of (a), (b), (c) and (d), being 100% by weight.

12. The method of claim 11 wherein the article is a can or can part.

13. The method of claim 11 wherein the coating agent is applied by anodic electrocoating.

14. The method of claim 11 wherein the coating is applied by spraying.

15. The method of claim 12 wherein the can or can part is comprised of tinplate, aluminum or steel.

16. The method of claim 12 wherein the can or can part is comprised of surface pre-treated steel sheeting.

17. The method of claim 12 wherein the can is a drawn and ironed, two-part drink can.

18. The method of claim 12 wherein the can is drawn and ironed or deep drawn foodstuff can.

19. The method of claim 11 further comprising sterilizing said article.

20. The method of claim 12 wherein the can part comprises a foodstuff can body or foodstuff can lid.

21. The method of claim 12 wherein the can part is a welded can body or a pull tab lid.

22. A coating agent as described in claim 1 wherein the phenolic and/or amino resin (b) is present in an amount ranging from 5 to 16% by weight.

23. A coating agent as described in claim 22 wherein the ammonia and/or amine neutralizing agent (c) is present in an amount ranging from 2 to 5% by weight.

24. A coating agent as described in claim 1, wherein the peroxidic initiator is at least 3% by weight based on the total weight of (a), (b), (c) and (d).

25. A coating agent as described in claim 7 wherein
   (x) is a monomer containing carboxyl groups present in an amount ranging from 20 to 40% by weight;
   (y) is a nonfunctionalized monomer present in an amount ranging from 20 to 40% by weight, and
   (z) is a hydroxy-functional (meth)acrylate having 1 to 20 carbons in the alcohol radical.

* * * * *

UNITED STATES PATENT AND TRADEMARK OFFICE
CERTIFICATE OF CORRECTION

PATENT NO. : 4,997,865
DATED : March 5, 1991
INVENTOR(S) : Karl-Heinz Scherping et al It is certified that error appears in the above-identified patent and that said Letters Patent is hereby corrected as shown below:

Column 4, line 60 should read:

--vinyltoluene and $\alpha$-methylstyrene, may be employed as--

Column 13, line 51, should read:

--polyester polycarboxylic acid (B) has an average molecular-- line 68, change

"... comprised of from 30 to 69% by weight..." to read

--...comprised of from 35 to 60% by weight...--

Signed and Sealed this

Ninth Day of March, 1993

Attest:

STEPHEN G. KUNIN

Attesting Officer    Acting Commissioner of Patents and Trademarks